(12) United States Patent
Matsubara et al.

(10) Patent No.: US 6,329,775 B1
(45) Date of Patent: Dec. 11, 2001

(54) CONTROL APPARATUS OF HYBRID VEHICLE FOR LIMITING OR STOPPING OUTPUT ASSIST USING MOTOR IN HIGH-SPEED DRIVING MODE

(75) Inventors: Atsushi Matsubara; Teruo Wakashiro; Kazutomo Sawamura; Atsushi Izumiura; Hideyuki Oki; Hideyuki Takahashi, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/631,682

(22) Filed: Aug. 2, 2000

(30) Foreign Application Priority Data

Aug. 4, 1999 (JP) .................................................. 11-221808

(51) Int. Cl.$^7$ .................................. H02P 3/14; B60K 6/00
(52) U.S. Cl. ........................... 318/376; 318/139; 180/65.2
(58) Field of Search ...................................... 318/375, 376, 318/382, 139; 180/65.2, 65.3, 65.4

(56) References Cited

U.S. PATENT DOCUMENTS 6,140,780 * 10/2000 Oshima et al. ...................... 318/139

FOREIGN PATENT DOCUMENTS 7-123509    5/1995 (JP) .

* cited by examiner

Primary Examiner—Khanh Dang
(74) Attorney, Agent, or Firm—Armstrong, Westerman, Hattori, McLeland & Naughton, LLP

(57) ABSTRACT

A control apparatus applied to a hybrid vehicle is disclosed, by which the output assist by the motor with respect to the engine output can be limited or stopped in the high speed driving mode. The control apparatus comprises a section for stopping the operation of the motor from assisting the engine output when the engine output is assisted by the motor and the speed of the vehicle exceeds a predetermined first threshold value; and a section for starting the regenerating operation of the motor when the speed of the vehicle exceeds a predetermined second threshold value which is larger than the first threshold value.

3 Claims, 5 Drawing Sheets

CONTROL APPARATUS OF HYBRID VEHICLE FOR LIMITING OR STOPPING OUTPUT ASSIST USING MOTOR IN HIGH-SPEED DRIVING MODE

BACKGROUND OF THE INVENTION

1. Field of the Invention

The present invention relates to a control apparatus of a hybrid vehicle which is driven by an engine and an electric motor, in particular, to one for controlling the amount of assisted (or auxiliary) output by the motor which assists the engine output when the vehicle is driven at high speed.

2. Description of the Related Art

Conventionally, a hybrid vehicle having not only the engine but also an electric motor as the drive source is known.

As a hybrid vehicle, a parallel hybrid vehicle is known, which uses an electric motor as an auxiliary drive source for assisting the engine output. In the parallel hybrid vehicle, the engine output is assisted using the electric motor during the accelerating operation (i.e., acceleration mode), while during the decelerating operation (i.e., deceleration mode), the battery and the like are charged via a regenerating operation, that is, "deceleration regeneration" is performed. According to various control operations including the above, the remaining capacity (corresponding to the electric energy) of the battery is maintained while the driver's demands can also be satisfied. An example thereof is disclosed in Japanese Unexamined Patent Application, First Publication, No. Hei 7-123509.

According to the control apparatus of such conventional hybrid vehicles, for example, in the acceleration mode, an assist driving force using a motor is also output in addition to the driving force obtained by the engine output. This output assist by the motor for assisting the engine output is continuously performed even in the high-speed driving mode in which the fuel supply to the engine is cut off according to a specific limit defined by the fuel supply. In this case, the engine side controls the vehicle so as to decrease its speed, but the motor side still controls the vehicle so as to assist the driving force obtained by the engine output. Therefore, these controls are inconsistent with each other.

Due to such an unnecessary assist by the motor, the battery capacity may be decreased, thereby causing excessive discharge of the battery.

SUMMARY OF THE INVENTION

In consideration of the above circumstances, an objective of the present invention is to provide a control apparatus applied to a hybrid vehicle, by which the output assist by the motor with respect to the engine output can be limited or stopped in the high speed driving mode.

Therefore, the present invention provides a control apparatus of a hybrid vehicle, wherein:
the hybrid vehicle comprises:
an engine for outputting force for driving the vehicle;
an electric motor for assisting the output from the engine according to the driving state of the vehicle; and
a battery device for storing energy generated using the motor as a generator driven by the engine, and energy regenerated via a regenerating operation performed by the motor when the vehicle is decelerated, and the control apparatus comprises:
a speed limiting section for stopping the operation of the motor from assisting the engine output when the engine output is assisted by the motor and the speed of the vehicle exceeds a predetermined first threshold value; and
a regenerating operation starting section for starting the regenerating operation of the motor when the speed of the vehicle exceeds a predetermined second threshold value which is larger than the first threshold value.

According to the above control apparatus, when the fuel is supplied to the engine and simultaneously the engine output is assisted by the motor, (i) the output assist can be stopped when the vehicle speed exceeds the first threshold value (e.g., 160 km/h), and (ii) when the vehicle speed further exceeds the second threshold value (e.g., 170 km/h), the regenerating operation using the motor can be started so as to store the engine output as regenerated energy, thereby decreasing the driving force obtained by the engine output. Therefore, the vehicle speed can be limited without stopping the fuel supply to the engine; thus, the purifier for purifying the exhaust gas of the vehicle is not much affected in comparison with the case of stopping the fuel supply.

In addition, the output assist using the motor is stopped before the fuel supply to the engine is stopped; thus, it is possible to prevent inconsistencies between the control at the engine side and the control at the motor side.

The present invention also provides a control apparatus of a hybrid vehicle, wherein:
the hybrid vehicle comprises:
an engine for outputting force for driving the vehicle;
an electric motor for assisting the output from the engine according to the driving state of the vehicle; and
a battery device for storing energy generated using the motor as a generator driven by the engine, and energy regenerated via a regenerating operation performed by the motor when the vehicle is decelerated, and the control apparatus comprises:
an assisted amount decreasing section for:
gradually decreasing an amount of the output from the motor for assisting the engine when the engine output is assisted by the motor and the speed of the vehicle exceeds a predetermined first threshold value; and
setting the amount of the assisted output to zero when the speed of the vehicle exceeds a predetermined second threshold value which is larger than the first threshold value; and
a generation starting section for generating energy by using the motor as a generator when the speed of the vehicle exceeds the second threshold value.

According to this control apparatus, when the fuel is supplied to the engine and simultaneously the engine output is assisted by the motor, (i) the output assist can be gradually decreased and stopped when the vehicle speed exceeds the first threshold value (e.g., 160 km/h), and (ii) when the vehicle speed further exceeds the second threshold value (e.g., 170 km/h), the motor can be used as a generator so as to generate energy by using the engine output, thereby limiting the vehicle speed. Therefore, the driving force can be smoothly decreased by gradually decreasing the amount of assisted output using the motor, and it is possible to prevent a sudden change of the driving state of the hybrid vehicle. In addition, the driving force obtained by the engine output can be smoothly decreased by converting the engine output to the generated energy, thereby improving the driving comfortableness.

The above structure may further comprise a fuel cut-off section for stopping the supply of fuel to the engine when the speed of the vehicle exceeds a predetermined third threshold value which is larger than the second threshold value.

In this case, when the vehicle speed exceeds the third threshold value (e.g., 180 km/h), the fuel cut-off can be executed so as to limit the vehicle speed. Here, the output assist using the motor has been completed when the fuel cut-off is executed; therefore, it is possible to prevent inconsistencies between the control at the engine side and the control at the motor side.

DESCRIPTION OF THE PREFERRED EMBODIMENTS

Figure 1:
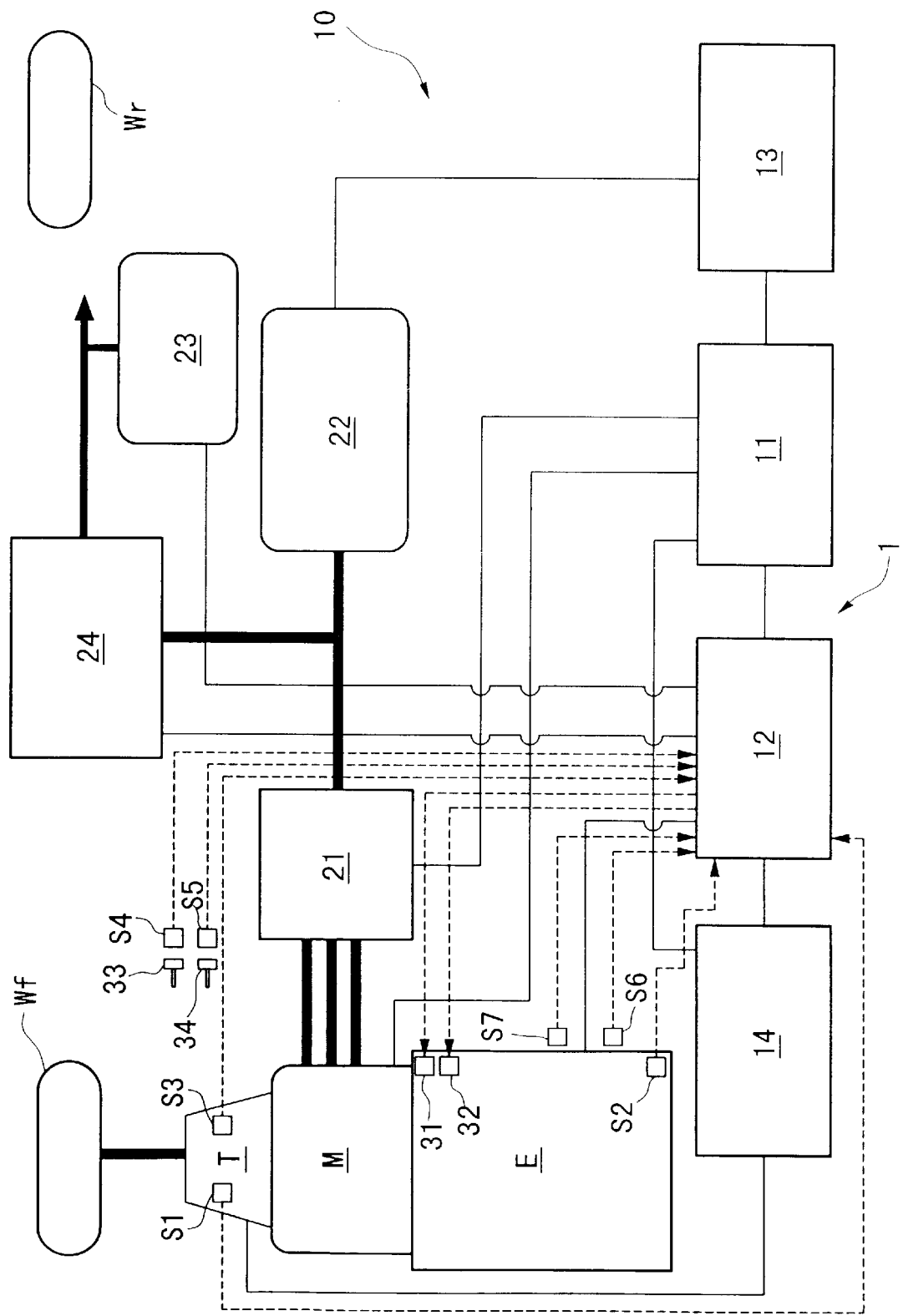
FIG. 1 is a block diagram showing the structure of the hybrid vehicle comprising the control apparatus as an embodiment according to the present invention.

Hereinafter, an embodiment of the control apparatus of a hybrid vehicle according to the present invention will be explained with reference to the drawings. FIG. 1 is a diagram showing the structure of the hybrid vehicle 10 comprising the control apparatus 1 as the embodiment.

The hybrid vehicle 10 is, for example, a parallel hybrid vehicle (as explained above), and the driving force generated by both the engine E and electric motor M is transmitted via automatic or manual transmission T to the front wheels (functioning as driving wheels) Wf, Wf. In the deceleration of the hybrid vehicle 10, when the driving force is transmitted from the front wheels Wf, Wf to the electric motor M, the electric motor M functions as a generator for generating what is termed regenerative braking force, that is, the kinetic energy of the vehicle body is stored as electric energy.

The control apparatus 1 (of the hybrid vehicle) according to the present embodiment comprises motor ECU 11, FIECU 12, battery ECU 13, and CVTECU 14.

The driving of motor M and the regenerating operation of motor M are performed by a power drive unit 21 according to control commands from a motor ECU 12. A high voltage battery 22 for sending and receiving electric energy to and from the motor M is connected to the power drive unit 21. The battery 22 includes a plurality of modules connected in series, and in each module, a plurality of cells are connected in series. The hybrid vehicle 10 includes a 12 volt auxiliary battery 23 for driving various accessories. The auxiliary battery 23 is connected to the battery 22 via a downverter 24. The downverter 24, controlled by an FIECU 12, reduces the voltage from the battery 22 so as to charge the auxiliary battery 23.

The FIECU 12 control in, addition to the motor ECU 11 and the downverter 24, a fuel supply amount controller 31 for controlling the amount of fuel supplied to the engine E, a starter motor 32, ignition timing, etc. Therefore, the FIECU 12 receives (i) a signal from a speed sensor $S_1$ for detecting the vehicle speed based on the rotation of the drive shaft of transmission T, (ii) a signal from an engine (rotational) speed sensor $S_2$ for detecting the engine (rotational) speed, (iii) a signal from a neutral switch $S_3$ for detecting the neutral position of the transmission T, (iv) a signal from a brake switch $S_4$ for detecting operation of a brake pedal 33, (v) a signal from a clutch switch $S_5$ for detecting the operation of a clutch pedal 34, (vi) a signal from a throttle opening-degree sensor $S_6$ for detecting the degree of opening TH of the throttle (valve), and (vii) a signal from an air-intake passage negative-pressure sensor $S_7$ for detecting the air-intake passage negative pressure PB.

The battery ECU 13 protects the battery 22, and calculates the remaining capacity SOC of battery 22. In addition, CVTECU 14 controls the CVT (continuously variable transmission).

Figure 2:
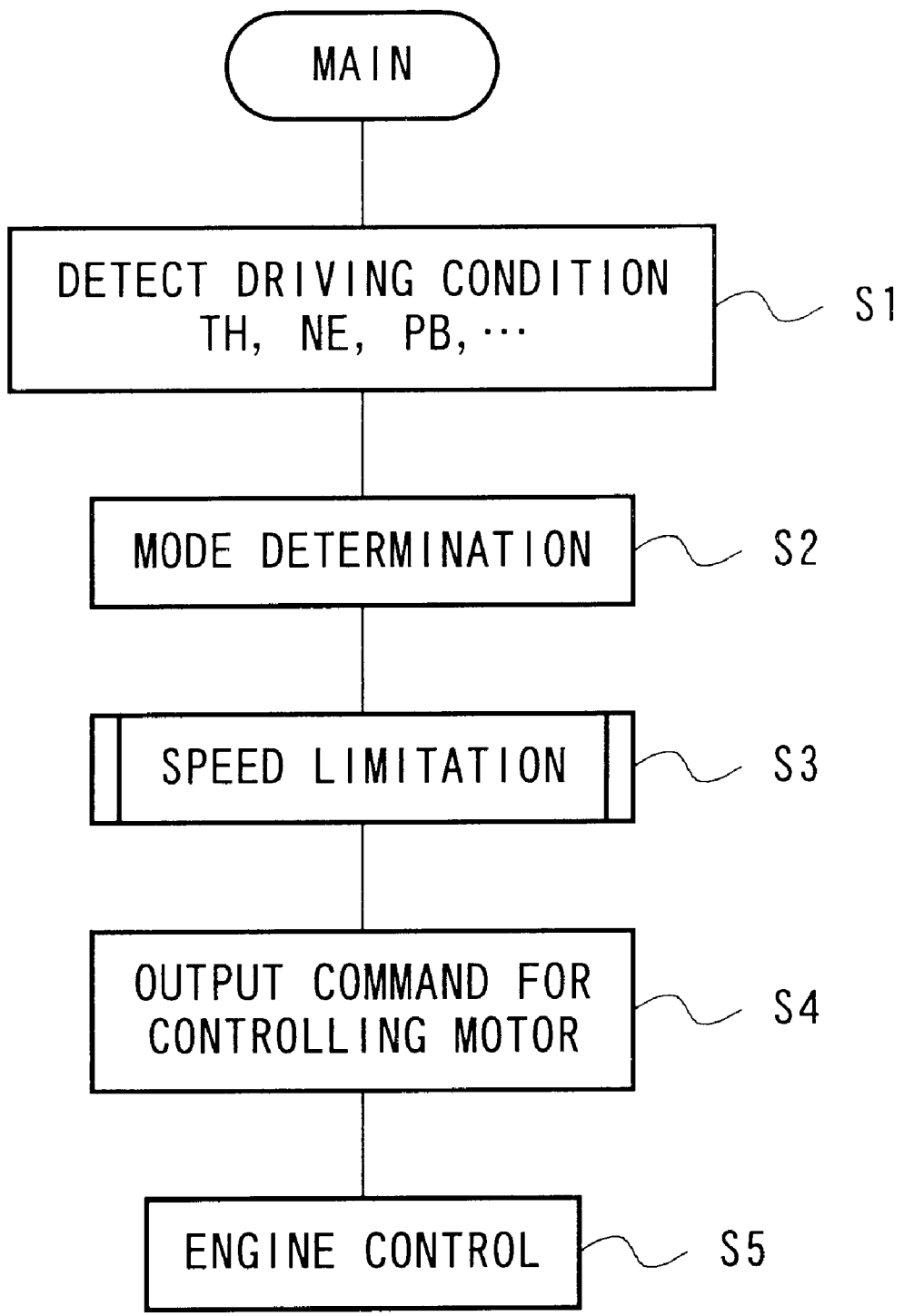
FIG. 2 is a flowchart showing the operation of the control apparatus of the hybrid vehicle shown in FIG. 1.
Figure 3:
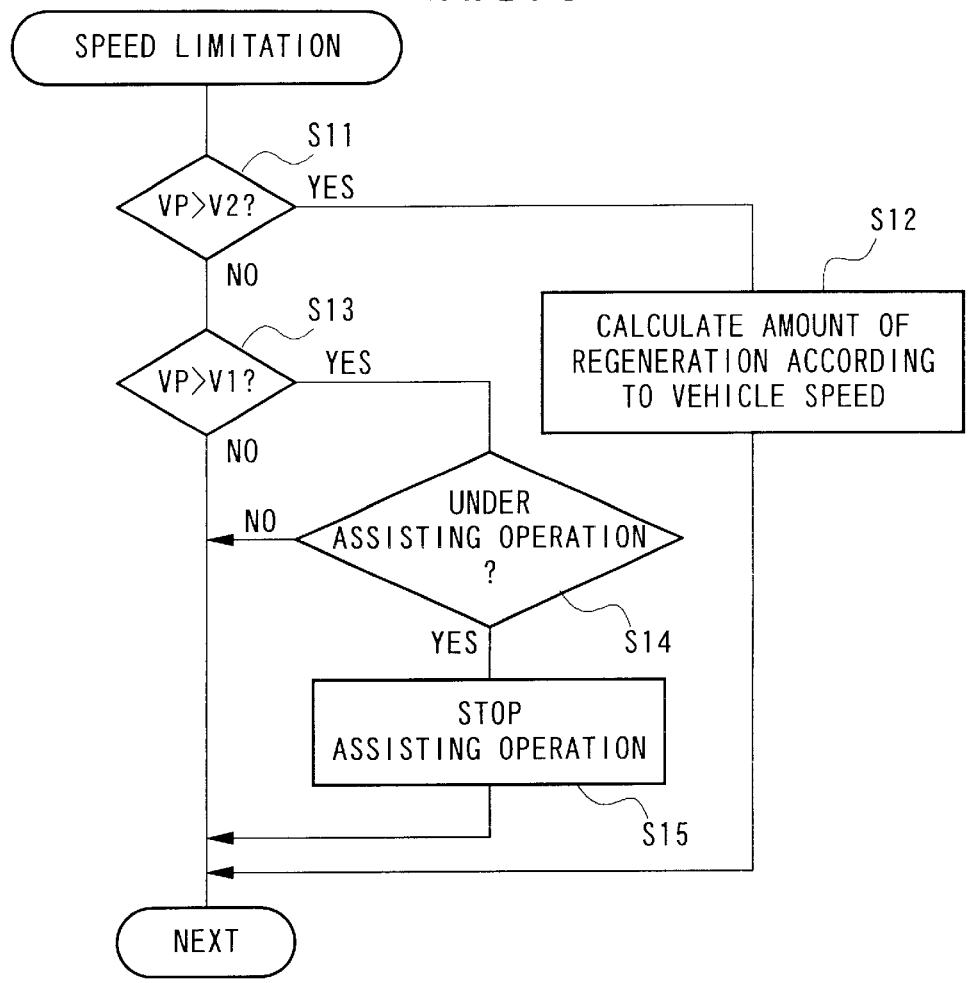
FIG. 3 is a flowchart showing the speed limiting operation in FIG. 2.
Figure 4:
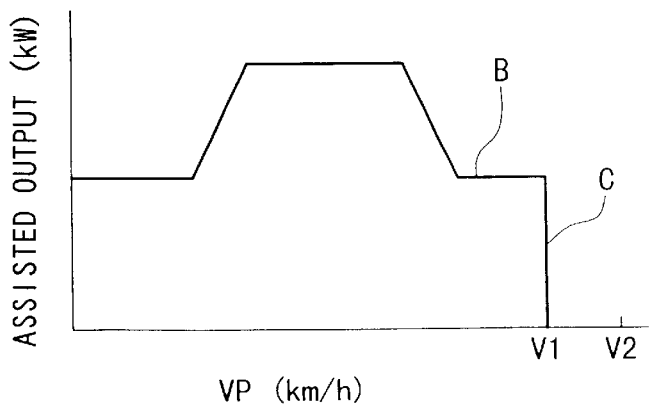
FIG. 4 is a graph showing the variation of the relationship between the vehicle speed VP and the amount of assisted output in the speed limiting operation shown in FIG. 3.

The control apparatus 1 applied to hybrid vehicles according to the present embodiment has the above-explained structure. Below, the operation of the control apparatus 1 of the hybrid vehicle will be explained with reference to the appended drawings. FIG. 2 is a flowchart showing the operation of the control apparatus 1 of the hybrid vehicle, FIG. 3 is a flowchart showing the operation performed in the process of limiting the vehicle speed included in the flowchart of FIG. 2, and FIG. 4 is a diagram showing the variation of the relationship between the vehicle speed VP and the amount of the assisted output when the process of limiting the vehicle speed, included in FIG. 3, is executed.

More specifically, according to the flowchart as shown in FIG. 2, the control apparatus 1 of the hybrid vehicle controls motor M while the hybrid vehicle 10 is being driven.

First, in order to detect the driving condition of the hybrid vehicle, the control apparatus 1 of the hybrid vehicle detects, for example, a signal corresponding to the engine speed NE output from the engine speed sensor $S_2$, a signal corresponding to the degree of opening TH of the throttle valve output from the throttle opening-degree sensor $S_6$, and a signal corresponding to the air-intake passage negative pressure PB output from the air-intake passage negative-pressure sensor $S_7$ (see step SI).

According to the driving condition based on the detected engine speed NE, degree of opening TH of the throttle, air-intake passage negative pressure PB (and the like), the operational mode of motor M is determined to be one among at least three different modes, such as the acceleration mode, deceleration mode, and cruise mode (see step S2). Here, in the acceleration mode, the driving force (i.e., output) of engine E is assisted by the driving force of motor M, while in the deceleration mode, regenerative braking using motor M is performed. In the cruise mode, motor M is not driven, but the motor M is used as a generator so that the hybrid vehicle 10 is driven using the driving force generated by the engine E.

In the mode determination, if the degree of opening TH of the throttle is zero, then the mode is determined to be the deceleration mode, while if the degree of opening TH of the throttle is not zero, then the mode is determined to be the acceleration or cruise mode. In order to determine the current mode from among the acceleration and cruise modes, it is possible to use a numerical condition with respect to both the engine speed NE and the air-intake passage negative pressure PB.

In the acceleration mode, the amount of output assisted by motor M is calculated. For example, (i) a map (not shown) between the engine speed NE and the air-intake passage negative pressure PB, and (ii) a map (not shown) between the engine speed NE and the degree of opening TH of the throttle are respectively searched to retrieve (i) the amount of the assisted output according to the air-intake passage negative pressure PB assigned to the relevant engine speed NE, and (ii) the amount of the assisted output according to the degree of opening TH of the throttle assigned to the relevant engine speed NE.

If it is determined, in step S2, that the mode is the deceleration mode, the amount of regeneration according to the regenerative braking by using motor M, that is, the amount of power generation (supplied to battery 22), is calculated.

If it is determined, in step S2, that the mode is the cruise mode, the amount of the power generation in the cruise mode is calculated based on, for example, the engine speed NE and the air-intake passage negative pressure PB.

Next, the process of limiting the vehicle speed (explained later) is performed (see step S3). According to various control conditions determined in the process (of step S3) of limiting the vehicle speed, a command for controlling the motor M is output (see step S4), and then the engine is controlled (see step S5).

Below, the operation performed in the process of limiting the vehicle speed will be explained with reference to FIG. 3.

First, it is determined whether the vehicle speed VP of the hybrid vehicle 1 is larger than the predetermined second speed V2, for example, 170 kmr/h (see step S11). If the result is "YES", then the motor M is commanded to execute the regenerating operation (see step S 12), and the operation shown in the present flowchart is completed. In this case, the set amount of regeneration gradually decreases according to the vehicle speed from, for example, a speed larger than the second speed V2 (the first speed will be explained below) to the second speed V2 at which the amount of regeneration is zero. That is, as the vehicle speed VP of hybrid vehicle 1 increases from the second speed V2 to a speed larger than the second speed, the set amount of regeneration gradually increases from zero.

On the other hand, if the result of the determination process in step S11 is "NO", then it is determined whether the vehicle speed VP of the hybrid vehicle 1 is larger than the first speed V1, which is smaller than the second speed V2, for example, 160 km/h (see step S13). If the result is "NO",then it is determined that no limitation relating to the vehicle speed is necessary and the operation of the present flow is completed.

If the result of the determining operation in step 13 is "YES", then it is further determined whether the driving force of engine E is currently assisted by the driving force output from the motor M (see step S14). If the result is "NO", then it is determined that no limitation relating to the vehicle speed is necessary and the operation of the present flow is completed.

If the result of the determining operation in step 14 is "YES", then, the output of the assisted amount is stopped as shown by line C in FIG. 4 (see step S15), and the operation of the present flow is completed. That is, for example, in the state that the output of the driving force of engine E is assisted by a suitable assist amount generated by motor M so as to accelerate the hybrid vehicle 1 (see the graph area indicated by line B in FIG. 4), the amount of assisted output becomes zero when the vehicle speed VP of the hybrid vehicle 1 exceeds the first speed V1.

According to the control apparatus 10 of the hybrid vehicle in the present embodiment, the following control example is possible: in the acceleration mode in which the fuel is supplied to engine E and the output of engine E is assisted using motor M, the output assisting operation is stopped when the vehicle speed VP exceeds the first speed, for example, 160 km/h. When the vehicle speed VP further exceeds the second speed V2, the regenerating operation using motor M is started, so that the output of engine E is gradually stored in battery 22 as regenerated energy and the driving force by the engine is gradually decreased. Therefore, the operation of limiting the vehicle speed can be performed without the fuel cut-off (i.e., without stopping the fuel supply).

Figure 5:
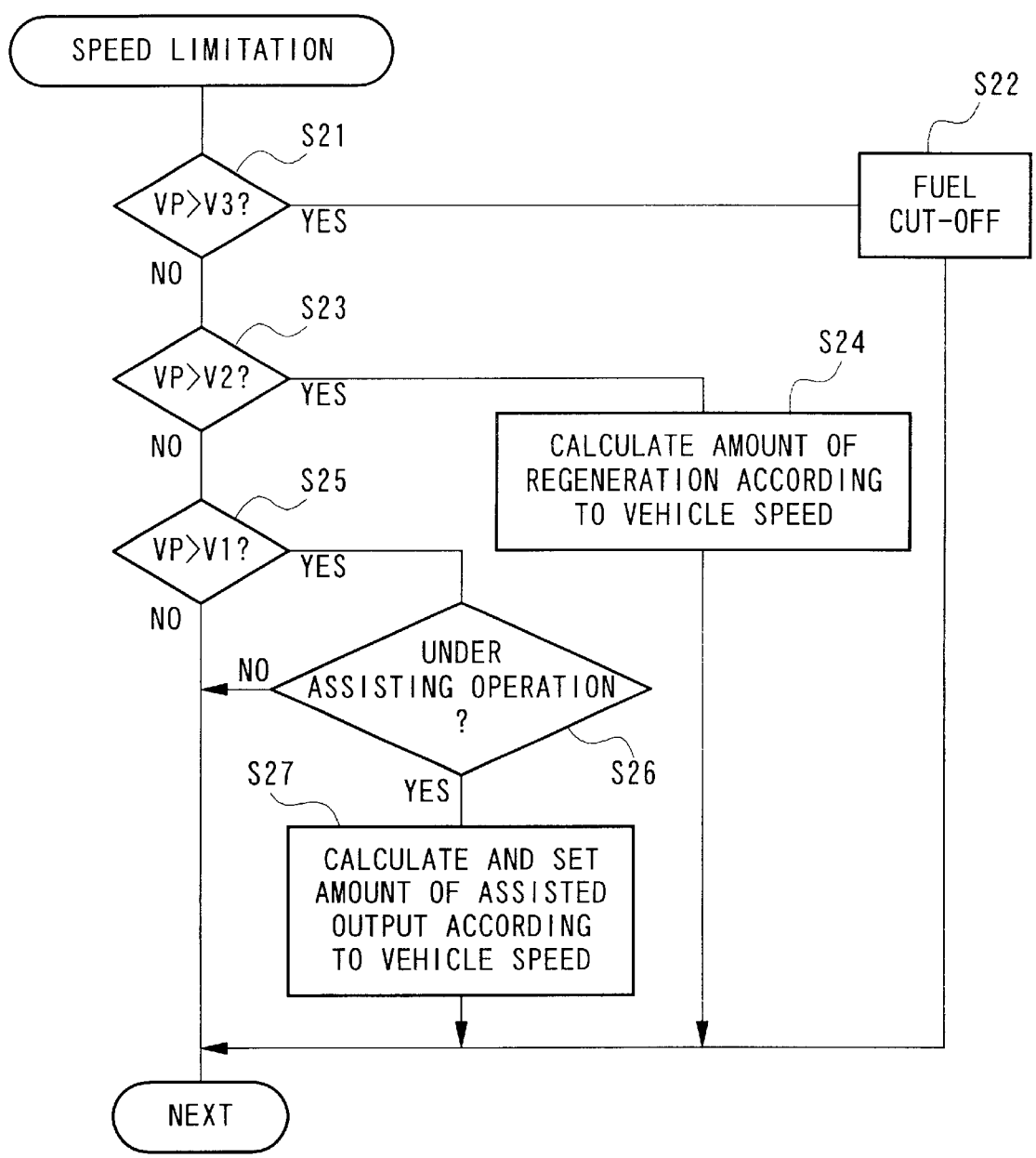
FIG. 5 is a flowchart showing a variation of the speed limiting operation shown in FIG. 2.
Figure 6:
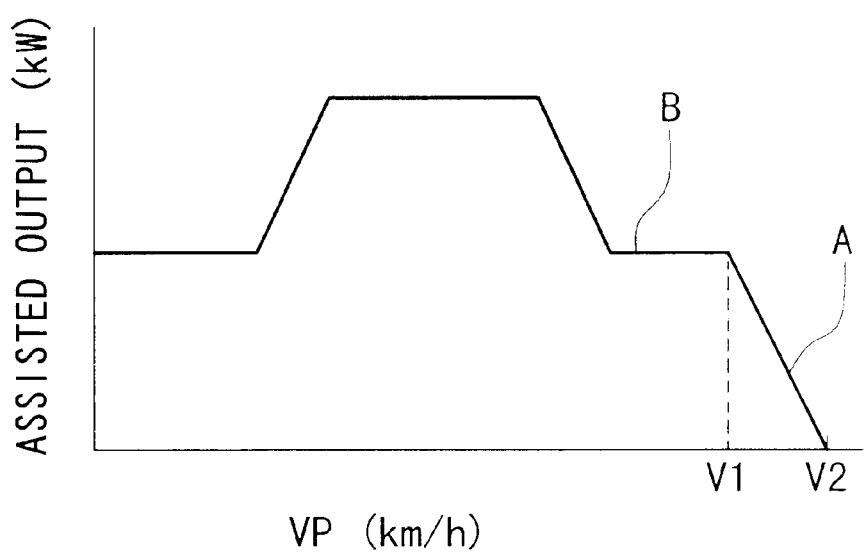
FIG. 6 is a graph showing the variation of the relationship between the vehicle speed VP and the amount of assisted output in the speed limiting operation shown in FIG. 5.

In the above embodiment, the set condition is such that the amount of assisted output becomes zero when the vehicle speed VP exceeds the first speed V1, for example, 160 km/h. However, the set condition is not limited to the above. FIGS. 5 and 6 show a variation of the operation of limiting the vehicle speed. FIG. 5 is a flowchart showing the operation of the variation of the process as shown in FIG. 2, while FIG. 6 shows the variation of the relationship between the vehicle speed VP and the amount of assisted output when the operation of limiting the vehicle speed as shown in FIG. 5 is carried out. In the variation, the amount of assisted output gradually decreases after the vehicle speed VP exceeds the first speed V1, for example, 160 km/h.

As shown in FIG. 5, it is determined whether the vehicle speed VP of hybrid vehicle 1 is larger than the predetermined third speed V3, for example, 180 km/h (see step S21). If the result is "YES", then the fuel cut-off(i.e., the fuel is not supplied to engine E) is commanded (see step S22), and the relevant operation of the present flow is completed.

If the result of determining step S21 is "NO", then it is further determined whether the vehicle speed VP is larger than the predetermined second speed V2 which is smaller than the third speed V3 (see step S23). The second speed V2 is, for example, 170 km/h. If the result is "YES", then the motor M is commanded to perform the regenerating operation (see step S24), and the operation of the present flow is terminated. In this case, the amount of regeneration gradually decreases from, for example, the third speed V3 to the second speed V2 at which the amount becomes zero. That is, under this set condition, as the vehicle speed VP of hybrid vehicle 1 increases from the second speed V2 to the third speed V3, the amount of regeneration by motor M gradually increases from zero.

If the result of determination process in step S13 is "NO", then it is further determined whether the vehicle speed VP of hybrid vehicle 1 is larger than the first speed V1 which is smaller than the second speed V2 (see step S25). The first speed V1 is, for example, 160 km/h. If the result is "NO", it is determined that the operation of limiting the vehicle speed is unnecessary, and the operation of the present flow is completed.

On the other hand, if the result is "YES", then it is further determined whether the driving force of engine E is currently assisted by using the driving force obtained by motor M (see step S26). If the result is "NO", then it is determined that the operation of limiting the vehicle speed is unnecessary, and the operation of the present flow is completed.

On the other hand, if the result is "YES", then it is defined that (see area A in FIG. 6) the amount of assisted output gradually decreases according to the increase of the vehicle speed from the first speed V1 to the second speed V2 at which the amount of assisted output becomes zero (see step S27), and the operation of the present flow is completed. For example, under the condition as shown by area B in FIG. 6 in which the output of the driving force of engine E is assisted by a suitable amount of output from the motor M and the hybrid vehicle 1 is accelerated, after the vehicle speed VP of the hybrid vehicle 1 exceeds the first speed V1, the amount of assisted output gradually decreases, and when the vehicle speed VP reaches the second speed V2, the amount of the assisted output becomes zero.

According to the control apparatus 10 for hybrid vehicles in the present embodiment, for example, in the acceleration mode in which the fuel is supplied to engine E and simultaneously motor M assists the output of engine E, the amount of assisted output is gradually decreased after the vehicle speed VP exceeds the first speed V1 (e.g., 160 km/h), and the amount of assisted output becomes zero when the vehicle speed VP reaches the second speed V2 (e.g., 170 km/h). In addition, if the vehicle speed VP exceeds the second speed V2, then the regenerating operation using motor M is started so that the output of engine E is gradually stored in battery 22 as regenerated energy. Therefore, the driving force can be smoothly decreased, and the vehicle speed can be limited while a sudden change of the driving state of the hybrid vehicle is prevented.

What is claimed is:

1. A control apparatus of a hybrid vehicle, wherein:

said hybrid vehicle comprises:

an engine for outputting force for driving the vehicle;

an electric motor for assisting the output from the engine according to the driving state of the vehicle; and a battery device for storing energy generated using the motor as a generator driven by the engine, and energy regenerated via a regenerating operation performed by the motor when the vehicle is decelerated, and said control apparatus comprises:

a speed limiting section for stopping the operation of the motor from assisting the engine output when the engine output is assisted by the motor and when the speed of the vehicle exceeds a predetermined first threshold value; and a regenerating operation starting section for starting the regenerating operation of the motor when the speed of the vehicle exceeds a predetermined second threshold value which is larger than the first threshold value.

2. A control apparatus of a hybrid vehicle, wherein:

said hybrid vehicle comprises:

an engine for outputting force for driving the vehicle;

an electric motor for assisting the output from the engine according to the driving state of the vehicle; and a battery device for storing energy generated using the motor as a generator driven by the engine, and energy regenerated via a regenerating operation performed by the motor when the vehicle is decelerated, and said control apparatus comprises:

an assisted amount decreasing section for:

gradually decreasing an amount of the output from the motor for assisting the engine when the engine output is assisted by the motor and the speed of the vehicle exceeds a predetermined first threshold value; and setting the amount of the assisted output to zero when the speed of the vehicle exceeds a predetermined second threshold value which is larger than the first threshold value; and a generation starting section for generating energy by using the motor as a generator when the speed of the vehicle exceeds the second threshold value.

3. A control apparatus as claimed in claim 2, further comprising:

a fuel cut-off section for stopping supplying fuel to the engine when the speed of the vehicle exceeds a predetermined third threshold value which is larger than the second threshold value.

* * * * *